United States Patent [19]

Dunn et al.

[11] 4,218,524
[45] Aug. 19, 1980

[54] IN-SITU PREPARATION OF THE SULFUR ELECTRODE FOR SODIUM-SULFUR BATTERIES

[75] Inventors: Bruce S. Dunn, Saratoga Springs; Manfred W. Breiter, Schenectady; Randall N. King, Johnstown, all of N.Y.

[73] Assignee: Electric Power Research Institute, Inc., Palo Alto, Calif.

[21] Appl. No.: 28,468

[22] Filed: Apr. 9, 1979

[51] Int. Cl.² ............................................. H01M 4/36
[52] U.S. Cl. .................................... 429/104; 29/623.1
[58] Field of Search ....................... 429/104; 29/623.1

[56] References Cited

U.S. PATENT DOCUMENTS

| | | | |
|---|---|---|---|
| 4,053,689 | 10/1977 | Breiter | 429/102 |
| 4,070,527 | 1/1978 | King et al. | 429/191 X |
| 4,146,684 | 3/1979 | Fischer et al. | 429/104 |

Primary Examiner—Charles F. LeFevour
Attorney, Agent, or Firm—Bertram I. Rowland

[57] ABSTRACT

Novel assembly method and sodium/sulfur battery prepared thereby are provided whereby, in a preformed sulfur compartment, the sulfur electrode is prepared in situ, providing for graduated resistance from the beta-alumina electrolyte to the container wall. The method employs providing for a high resistance conductor as a relatively thin sheet adjacent the beta-alumina electrolyte and a conductive sulfur electrolyte extending from the high resistance conductor to the container wall, whereby the electrolyte is composed of sulfur and small carbon fibers. Conveniently, the high resistance film is positioned adjacent the beta-alumina electrolyte and appropriate amounts of the carbon fiber are introduced into the electrolyte chamber, followed by the addition of molten sulfur.

7 Claims, 3 Drawing Figures

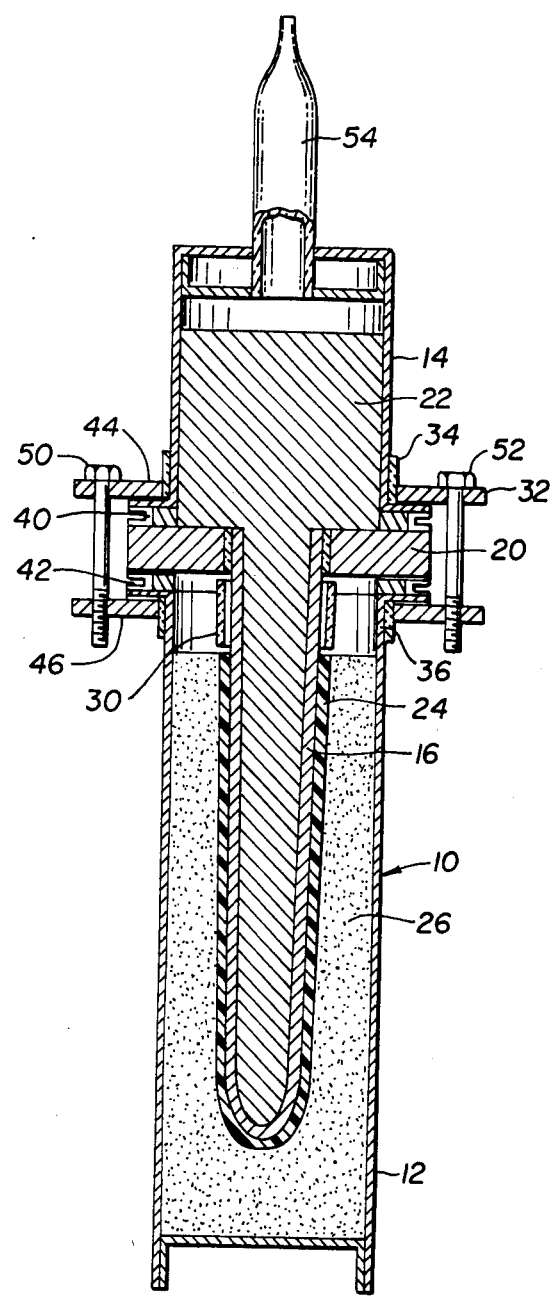
FIG._1.

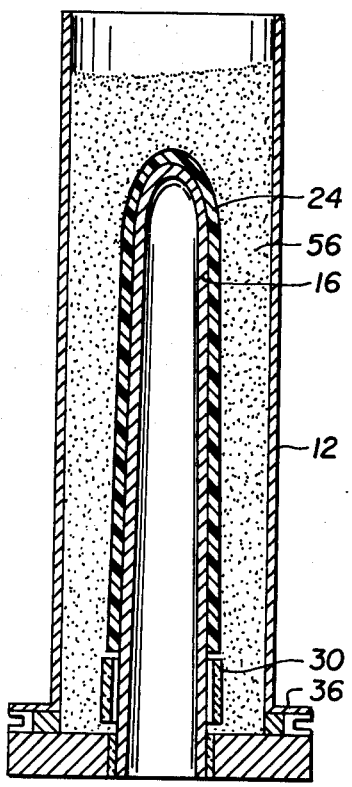
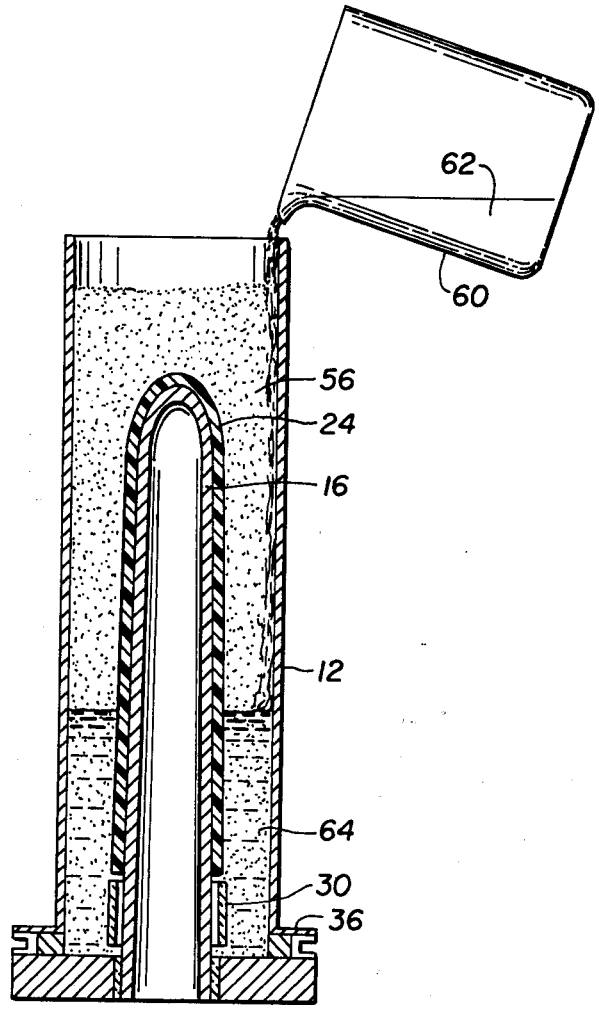
FIG._2.   FIG._3.

IN-SITU PREPARATION OF THE SULFUR ELECTRODE FOR SODIUM-SULFUR BATTERIES

This invention was made under contract with or supported by the Electric Power Research Institute, Inc. of Palo Alto, California.

BACKGROUND OF THE INVENTION

1. Field of the Invention

In attempting to develop new technologies for economical storage of energy, the sodium/sulfur battery offers many advantages. The sodium/sulfur battery is rechargeable, has large storage capacity, and employs relatively inexpensive materials of low atomic weight, so that storage capacity per unit weight is greater than heavier elements, such as lead.

While the properties of sodium and sulfur as electrodes, in combination with a beta-alumina solid electrolyte have many instrinsic advantages, they also provide many new and unique problems. The sodium/sulfur battery must operate at elevated temperatures, of the order of 300° C. or above. At these temperatures, both sodium and sulfur can be highly reactive and corrosive with a wide variety of materials. Furthermore, electricity must be introduced into and removed from the sulfur electrode at these temperatures. However, sulfur is nonconductive, so that means must be provided for the introduction and removal of electrons.

It has further been found, that during discharge and recharge, a film of sulfur may build up at the electrolyte surface, so that passage of electricity to the electrode is inhibited by the high resistance offered by the sulfur adjacent the electrolyte.

Faced with these unique problems associated with the nonconductive sulfur electrode, a solid electrolyte, and high temperatures of operation, various new approaches have been required to provide for efficiently operating batteries.

Even where advances have been made in the structure of prototype Na/S cells, assembly procedures useful in producing small prototype Na/S cells are not necessarily feasible for the production of full-size cells. One such example, is the known methods for preparation of the graduated resistance sulfur electrode. The advent of thermocompression bonding (TCB) has resulted in the sulfur compartment being attached to the alpha-alumina insulator prior to the insertion of the sulfur electrode. In small prototype cells this compartment is sealed after the sulfur electrode is formed. Proper operation of the sulfur electrode demands that the carbon fibers produce continuous contact between the beta-alumina tube and the container wall throughout the length of the solid electrolyte. Thus any process which requires that a pre-cast electrode plug be slid into place over a length of 15 inches is fraught with the potential for problems, such as regions of poor contact. Moreover, the precasting of the electrode plug in and of itself has problems and costs associated with molding and machining of the plugs to specific dimensions.

2. Description of the Prior Art

U.S. Pat. No. 4,070,527 describes the use of graduated resistive material in a sulfur electrode, specifically mats of carbon fibers having differential resistivity. U.S. Pat. No. 4,053,689 describes the use of a carbon fiber mat for contacting a molybdenum or chromium coated surface of an aluminum conductor to provide electrical conductance through the sulfur electrode. U.S. Pat. No. 4,048,390 is cited as of interest.

SUMMARY OF THE INVENTION

A conductive sulfur electrode is provided by preparing the electrode in situ in the sulfur electrode container. A conductive high resistivity carbon film or mat having structural integrity is provided for positioning as a layer adjacent the beta-alumina electrolyte. A sulfur electrode is prepared by forming the electrode of molten sulfur and small carbon fibers, either precasting the sulfur electrode or preferably forming it in situ in the sulfur electrode compartment of the battery, with the high resistivity film in position adjacent the beta-alumina electrolyte. The resultant sulfur electrode provides for efficient conductance from the electrolyte to the container wall, without building up a highly resistive sulfur layer adjacent the electrolyte.

BRIEF DESCRIPTION OF THE DRAWING

FIG. 1 is a schematic elevational view of a sodium/sulfur battery in accordance with this invention;

FIG. 2 is a schematic elevational view of the sulfur compartment containing the solid electrolyte and carbon fibrils; and FIG. 3 is a schematic elevational view of the sulfur compartment according to FIG. 2 with molten sulfur being introduced from a container.

DESCRIPTION OF THE SPECIFIC EMBODIMENTS

Improved sodium/sulfur batteries are provided, where electrical conductivity is maintained during charging and discharging of the battery by providing for a high resistivity zone adjacent the electrolyte and a sulfur electrode prepared, normally in situ by first introducing a sufficient amount of a shredded mat having small carbon fibers to a desired height, followed by the addition of molten sulfur. The resulting electrode is homogenous, has a good electrical conductivity, and is easily fabricated.

The subject method and resulting product provides a number of advantages. First, the resulting method and apparatus can be easily and efficiently fabricated. The high resistive sleeve or cover is readily positioned in contact with the electrolyte to provide for efficient electrical conductivity. The low resistivity conductive carbon is easily introduced into the container about the electrolyte and high resistivity mat so as to provide for good electrical conductivity between the conductive carbon mat and fibers. The desired height and packing of the fibers is readily determined. The molten sulfur may then be introduced and is found to wet the carbon so as to make good electrical contact between the sulfur and the conductive carbon. Alternatively, the carbon fibers and sulfur may be mixed together before being poured into the electrode container. In a prefered embodiment the high resistance mat is inserted after casting the sulfur, i.e., as the last step of the sulfur electrode forming process. In each instance of in situ formation, the sulfur electrode is easily formed to the desired dimensions, avoiding voids and providing for excellent uniformity in electrical conductivity.

A discussion of using graded resistivity in the sulfur electrode is described in U.S. Pat. No. 4,070,527. In accordance with this invention, a beta-alumina electrolyte is prefabricated to a desired configuration. Conveniently, the beta-alumina electrolyte can be in the shape of a tube and serves as a holder for the sodium electrode. Surrounding the beta-alumna electrolyte is a thin sleeve of a highly resistant material, conveniently a carbon felt or paper. The resistivity is normally of the order of 1000 to 5000 ohm-cm. The thickness of the felt or paper will generally be from about 0.05 to 0.15 cm, more usually from about 0.05 to 0.1 cm and preferably from about 0.05 to 0.08 cm. These materials should be relatively rigid, easy to handle and readily fabricated. Desirably, the materials are formed in a shape to be slipped over or applied to the solid electrolyte so as to provide for good contact with the electrolyte and wetting between the electrolyte and the mat by molten sulfur. Where the beta-alumina electrolyte is a tube closed at one end, the high resistivity cover fits over the tube as a sleeve.

Conveniently, the electrolyte with the associated high resistivity coating or cover can be positioned in the sulfur electrode container. The container may be of any convenient material, either conductive or nonconductive, preferably conductive. Useful materials include molybdenum and chromium coated aluminum or low carbon steel. After positioning the electrolyte in the sulfur electrode container, small carbon fibers, particularly graphite fibers, either individually or partially associated as mat fragments, of a size in the range of 0.5 to 2 mm, more usually of 0.75 to 1.5 mm in length and about 5 to 25 microns in diameter are then poured into the container to the appropriate height. The porosity of the fibers in the container will be greater than 90% usually about 95 to 98%. The difference in specific resistivity between the matrix composed of the small fibers and the high resistivity mat will be between 100 and 1000 times less, and preferably 600 times less.

After the low resistivity fibers have been added to the desired height, molten sulfur is poured into the compartment which is maintained at an elevated temperature so that the sulfur does not immediately solidify. Generally, temperatures in excess of 100° C. will suffice.

Alternatively, after positioning the electrolyte in the sulfur electrode container, molten sulfur admixed with small carbon fibrils may be poured into the container.

An additional advantage of the in situ formation of the sulfur electrode of the present invention is safety. The sulfur electrode is fabricated prior to any addition of sodium. Thus the molten products are prevented from being in the same container before the cell is assembled. Typically, a sodium electrode would be placed in its compartment by methods known to those skilled in the art. With the present invention, although both reactants would be present, they would be at lowered temperatures, i.e., cooled.

To further understand the subject invention, the drawings will now be considered. In FIG. 1, an exemplary sodium/sulfur battery is depicted. The sodium/sulfur battery 10 has a sulfur electrode container 12, a sodium electrode container 14 and a beta-alumina electrolyte tube 16 as its primary structural elements. The beta-alumina electrolyte tube 16 is bonded to an alpha-alumina ring 20. The sodium container 14 and beta-alumina electrolyte tube 16 are substantially filled with sodium 22. Surrounding the beta-alumina electrolyte tube 16 is a thin nonconductive carbon paper or felt 24. Substantially filling the sulfur container 12 and surrounding the non-conductive carbon sleeve 24 is the sulfur electrode 26 composed of sulfur and conductive carbon fibrils and mat particles composed of the fibrils. The sleeve is nonconductive carbon felt, Mat 31, supplied by Union Carbide Corp.

The beta-alumina electrolyte tube 16 is positioned by a glass spacer 30. The sodium container 14 and sulfur container 12 are rigidly held together by means of assembly 32. Bonded to the sodium container 14 is a flange 34, while bonded to the sulfur container 12 is a flange 36. The flanges 34 and 36 are spaced apart from the alpha-alumina ring 20 by means of mechanical seals 40 and 42 respectively. Rings 44 and 46 are held in compressive contact with flanges 34 and 36 respectively by means of bolts 50 and 52. The tightening of the bolts 50 and 52 provides for the sealing of the two containers together to prevent any leakage from the containers. In other embodiments, wherein thermocompression seals are utilized, the battery electrode containers, flanges, etc. would be modified accordingly. Conduit 54 permits the introduction of sodium into sodium container 14.

In FIG. 2, is depicted the sulfur container 12 filled with carbon fibrils and particles 56 in which is seated the beta-alumina electrolyte tube 16 surrounded by the high resistive carbon paper or felt sleeve 24. The carbon fibrils are shredded Thornel VMD supplied by Union Carbide Corp. The beta-alumina electrolyte tube 16 is positioned by means of spacer 30.

In FIG. 3, the same sulfur electrode container is depicted. In addition, molten sulfur container 60 containing molten sulfur 62 is shown with molten sulfur being poured into the sulfur container 12 where it has begun to accumulate to form a portion of the sulfur electrode 64 at the sealed end of container 12. The sulfur is poured until the appropriate height is achieved and all of the carbon fibrils and particles are coated with the sulfur.

As discussed hereinbefore in alternative embodiments the carbon fibrils 56 may advantageously be admixed with the molten sulfur 62 before pouring and/or the high resistive carbon paper or felt sleeve 24 may be placed around the beta-alumina electrolyte tube 16 subsequent to the pouring of the molten sulfur 62 into the container 12.

After the sulfur electrode has been formed, the sulfur container can then be used to assemble the sodium-sulfur battery.

In accordance with this invention, a simple rapid and efficient method is provided for forming a sulfur electrode in a sodium-sulfur battery. Problems of the prior art are avoided, since the subject method avoids any machining, the various components being easily fitted or formed in situ.

In addition, there is no need to attempt to slip or pass one solid material past another. This is particularly important, where one has to have two different resistive materials to provide a resistivity gradient in the sulfur electrode. Since the carbon felts, papers and mats, for the most part, do not have strong structural integrity mechanical movement of one against the other can result in discontinuities, breaks and tears.

Furthermore, the present method provides for a uniform distribution of conductive carbon particles or fibrils throughout the sulfur, to provide for uniform resistivity in the sulfur electrode, except for the region immediately adjacent to the beta-alumina electrolyte. Also, by virtue of the subject invention, the sulfur electrode is formed to fit properly in the container and have continuous contact with the beta-alumina electrolyte and high resistivity region adjacent the electrolyte.

Although the foregoing invention has been described in some detail by way of illustration and example for purposes of clarity of understanding, it will be obvious that certain changes and modifications may be practiced within the scope of the appended claims.

What is claimed is:

1. An improved sodium/sulfur battery having a sulfur electrode, a sodium electrode and a solid electrolyte intermediate said two electrodes, formed by the method of:
   (a) introducing small relatively low electrically resistive carbon fibrils and molten sulfur into a sulfur compartment of a sodium/sulfur battery; and
   (b) positioning in said sulfur compartment, a highly resistive carbonaceous layer, intermediate said solid electrolyte and said sulfur electrode, said layer being positioned so as to fit about the solid electrolyte present in said sulfur compartment in order to provide graduated resistance from said solid electrolyte to the wall of said compartment.

2. An improved sodium/sulfur battery according to claim 1, wherein said compartment is heated during the introduction of said molten sulfur.

3. An improved sodium/sulfur battery according to claim 1, wherein said layer is of from about 0.05 to 0.17 cm in thickness and said fibrils are from about 0.5 to 2 mm in length and the porosity of said fibrils prior to introduction of said molten sulfur is greater than 90 and less than 98%.

4. An improved sodium/sulfur battery according to claim 1, wherein said solid electrolyte is in the shape of a tube closed at one end and said high electrically resistive carbonaceous layer is in a form of a sleeve over said tube and of a thickness of about 0.05 to 0.1 cm.

5. A method for preparing the sulfur electrode in a sodium/sulfur battery which comprises applying to the surface of the solid electrolyte a thin layer of a high electrically resistive carbonaceous material;
   positioning said solid electrolyte with said layer in the sulfur compartment of said sodium/sulfur battery;
   introducing small relatively low electrically resistive carbon fibrils into said sulfur compartment to a predetermined height and a porosity in the range of about 90 to 98%; and
   introducing molten sulfur into said compartment to substantially completely coat said layer and said fibrils.

6. A method according to claim 5, wherein said fibrils are from about 0.5 to 2 mm in length and said layer is of a thickness of from about 0.05 to 0.15 cm.

7. A method according to claim 6, wherein said compartment is heated while said sulfur is introduced into said compartment.

* * * * *